United States Patent

[11] 3,566,097

[72] Inventor Volker Hildebrandt
Constance, Germany

[21] Appl. No. 621,047
[22] Filed Mar. 6, 1967
[45] Patented Feb. 23, 1971
[73] Assignee Telefunken Patentverwerlungsgesellschaft m.b.H.,
Ulm Danube, Germany
[32] Priority Mar. 17, 1966
[33] Germany
[31] T30695

[54] ELECTRONIC CALCULATOR UTILIZING DELAY LINE STORAGE AND INTERSPERSED SERIAL CODE

13 Claims, 5 Drawing Figs.

[52] U.S. Cl. .......... 235/159, 235/92, 235/168, 235/176
[51] Int. Cl. .......... G06f 7/38, G06f 13/02, G06f 15/00
[50] Field of Search .......... 235/159, 165, 167, 177

[56] References Cited

UNITED STATES PATENTS 3,304,418 2/1967 Perotto et al. .......... 235/159
3,370,158 2/1968 Lehmer .......... 235/159
3,432,816 3/1969 Hutchinson et al. .......... 235/165X

*Primary Examiner*—Malcolm A. Morrison
*Assistant Examiner*—R. Stephen Dildine, Jr.
*Attorney*—Spencer and Kaye

ABSTRACT: An electronic calculator for performing arithmetic operations on binary coded numbers using delay line storage techniques. Four dynamic storage positions are defined in a single channel delay line storage loop by means of timing pulses, and binary coded numbers are introduced into and extracted from the delay line storage loop through a shift register which is coupled to an adder circuit. Binary coded numbers are stored in the delay line storage loop in accordance with an interspersed serial code in which each bit of each binary number is adjacent in the time sequence to the corresponding bit of a different binary number, whereby the consecutive bits of each binary number are separated from each other in the time sequence and are interspersed among the individual bits of other binary numbers. This interspersed serial code allows the delay line storage loop to be operated at a substantially higher bit rate than the shift register and adder circuit, thereby materially reducing the size and cost of the delay line, shift register and adder circuits.

INVENTOR
Volker Hildebrandt
BY Spencer & Kaye
ATTORNEYS

INVENTOR
Volker Hildebrandt

BY Spencer & Kaye
ATTORNEYS

INVENTOR
Volker Hildebrandt

BY Spencer & Kaye
ATTORNEYS

ELECTRONIC CALCULATOR UTILIZING DELAY LINE STORAGE AND INTERSPERSED SERIAL CODE

BACKGROUND OF THE INVENTION

The object of this invention is to provide an electronic calculator having an inexpensive arithmetic unit which can be constructed to occupy minimum space and which is particularly suitable for use as a portable or table model calculator.

An electronic calculator for all four fundamental operations requires, as is known, at least three registers for storing operands, results, and sums of results in complete, multidigit numbers. A fourth register, however, is usually unavoidable for the accumulation of results. Such registers for operands, results, and sums of results will be called "main registers" to distinguish them from partial registers which register only fragments of numbers to be calculated, particularly single digits in coded form. An electronic calculator which performs only addition and subtraction requires at least two main registers. An electronic calculator which performs all four fundamental operations requires three or four main registers. Since these registers, in static form, are relatively complex, costly, and bulky, the principal object of this invention is to provide an electronic calculator which avoids the use of static parallel registers for the main registers and which further reduces the cost, complexity, and size of the calculator's arithmetic unit.

SUMMARY OF THE INVENTION

In accordance with this invention, the use of parallel static registers for the main registers of an arithmetic unit is avoided by storing the operands, results, and sums of results in a fast and therefore relatively short pulse delay line which can be, for instance, a glass rod having a piezoelectric transducer at one end for introducing shear pulses into the rod which, upon arrival at the other end, are there reconverted into electrical pulses by means of a second piezoelectric transducer and then returned to the input transducer via a feedback loop.

The use of such delay line dynamic storage units in calculators is known per se, as well as the associated serial mode of operation with a serial adder for forming a sum of a plurality of sums. This invention, however, provides an improved delay line dynamic storage unit, along with a novel serial code and timing circuit therefor, which is particularly suitable for use in the arithmetic unit of a table model calculator.

The invention utilizes the above-noted technique for an electronic calculator having at least two, and preferably four or more, main registers for calculations in all four fundamental operations with the capability of accumulation and provides the calculator with serially contained bit positions for binary coding the numerals in all positions of the main registers within a bit circulating channel. A shift register a coupled to one end of the delay line to introduce numbers into and extract numbers out of the bit circulating channel in accordance with various clock pulses, and an adder circuit is coupled to the shift register for performing the arithmetic operations. The numbers are introduced into the bit circulating channel in accordance with a novel interspersed serial coded in which each bit of each binary number is adjacent in the time sequence to the corresponding bit of a different binary number, whereby the consecutive bits of each binary number are separated from each other in the time sequence and are interspersed among the individual bits of other binary numbers. This interspersed serial code allows the bit circulating channel to be operated at a substantially higher bit rate than the shift register and adder circuit, which materially reduces the size and cost of the delay line, shift register, and adder circuit. In addition, the interspersed serial code of this invention makes it possible to directly combine coded readings from the same or the preceding or the following main register position as well as from the same bit position of different main registers without a waiting period within the pattern of the working frequency.

In addition to these major characteristics, the present invention provides further improvements in the number storage, addition, and input/output circuits of electronic calculators as described below in connection with the attached drawings.

DESCRIPTION OF THE PREFERRED EMBODIMENTS

Figure 1:
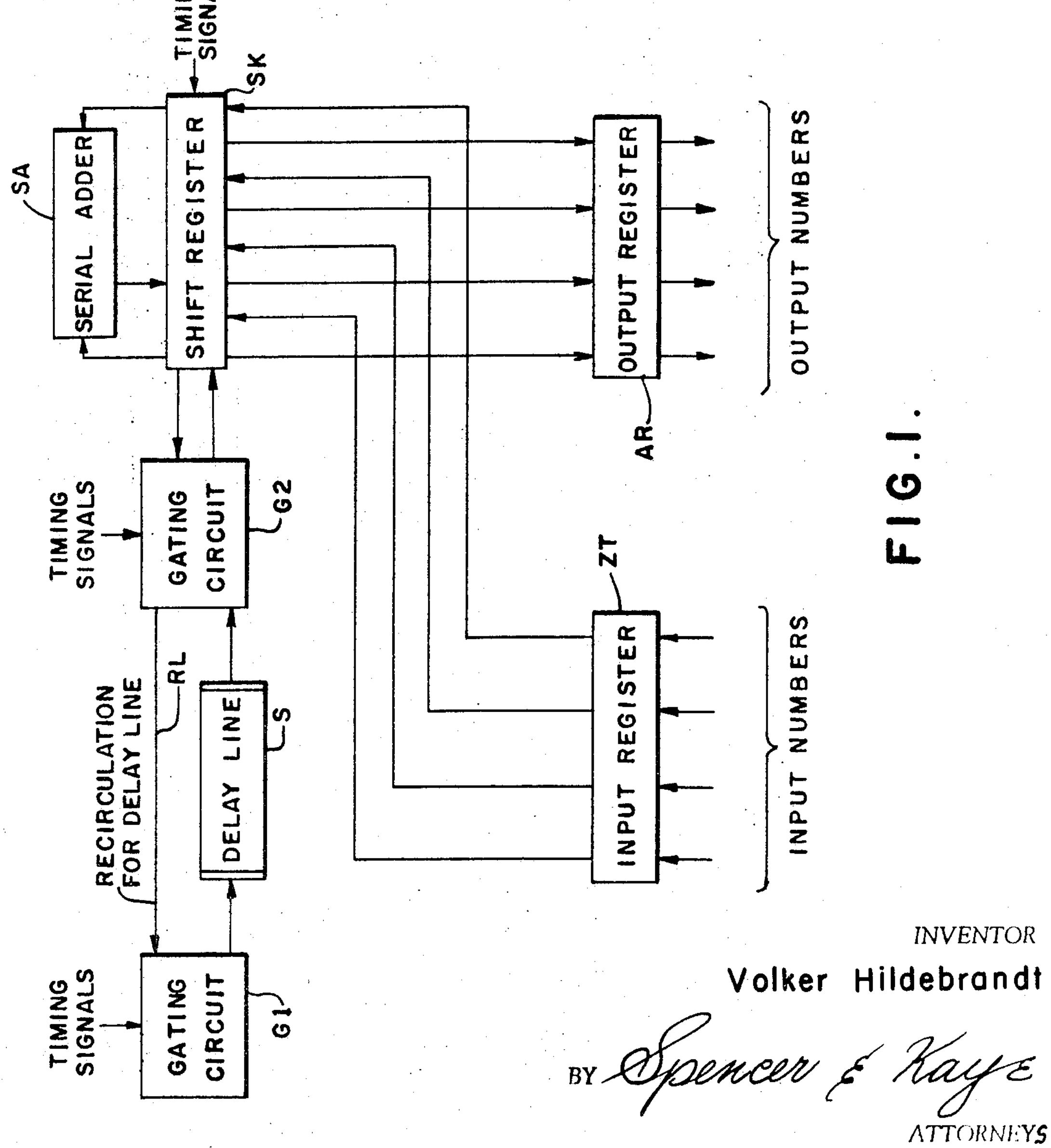
FIG. 1 is a block diagram of a general embodiment of the invention.

Referring to FIG. 1, in a general embodiment of the invention, binary coded input numbers are applied to an input register ZT and are transferred in parallel to a shift register SK. The numbers are then entered serially into a delay line storage loop comprising delay line S, feedback conductor RL, and gating circuits G1 and G2. After the numbers have been entered into the delay line storage loop, they are extracted from the storage loop and added in a serial adder SA which is coupled to shift register SK. The partial sums of the numbers are stored in the storage loop, and the final sum is transferred via shift register SK to an output register AR.

Figure 2:
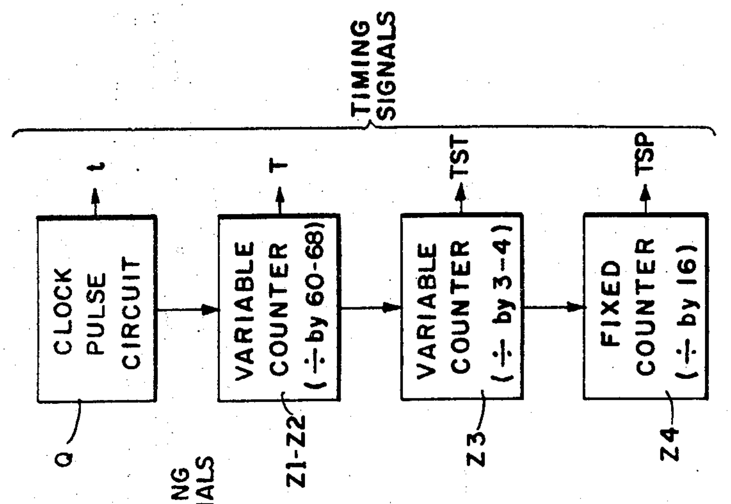
FIG. 2 is a block diagram of a timing circuit for the embodiment shown in FIG. 1.

The numbers entered into delay line S are coded in accordance with a novel interspersed serial code which is generally defined by the timing circuit shown in FIG. 2. A clock pulse circuit Q produces bit time pulses $t$ which define the bit time periods in delay line S. A variable counter Z1–Z2 divides the pulses $t$ by 60—68 to produce a timing signal T which defines the shift time periods for shift register SK and serial adder SA. Thus in this particular embodiment of the invention, the bit rate of delay line S is 60—68 times higher than the shift rate of shift register SK and serial adder SA, which permits a considerable reduction in the cost, complexity, and volume of the circuit. The above noted interspersed serial code, which is described in detail in later paragraphs, is further defined by timing signals TST and TSP, which are derived respectively from variable counter Z3 and fixed counter Z4.

Figure 3:
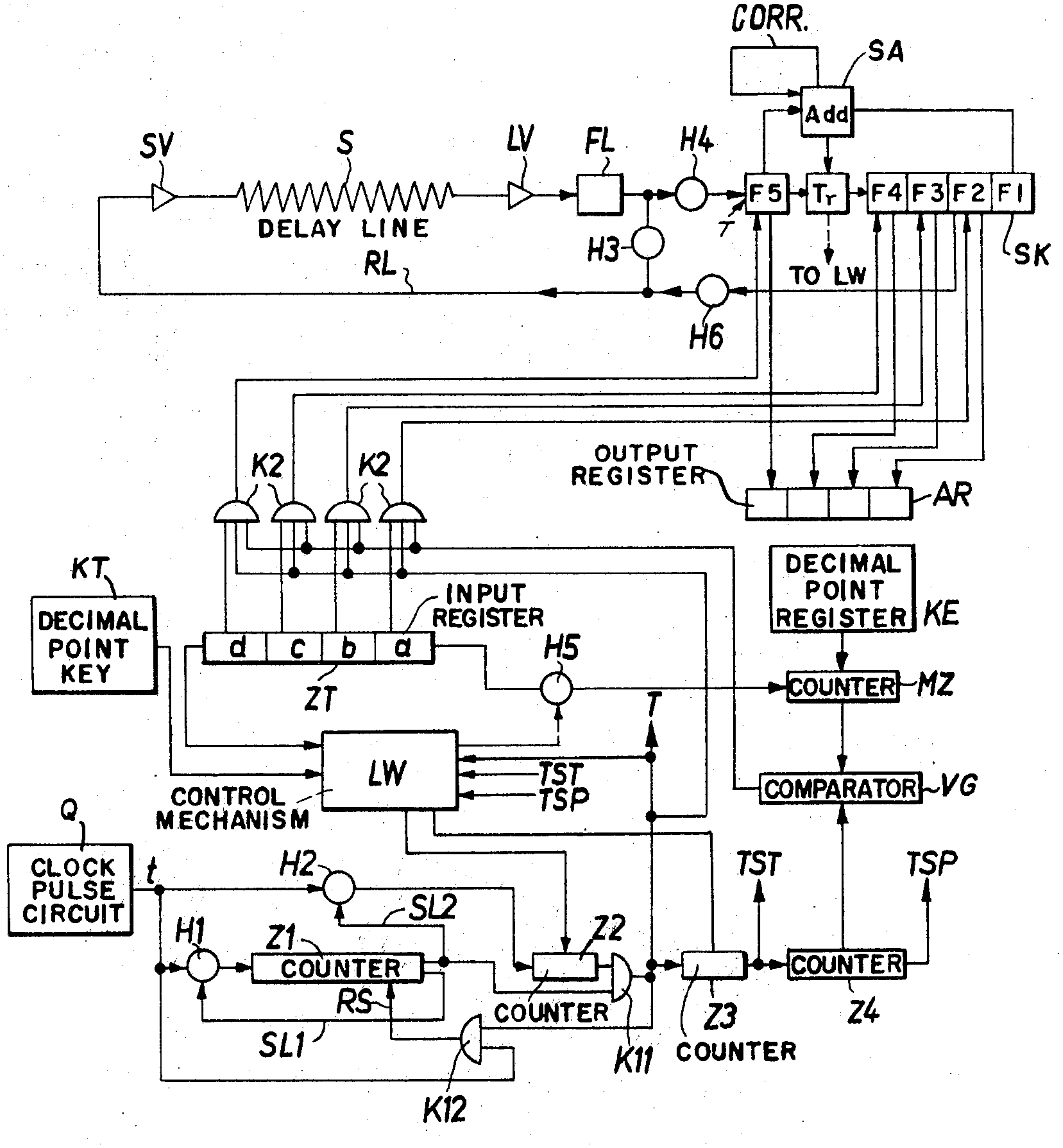
FIG. 3 is a more detailed block diagram of the embodiment shown in FIGS. 1 and 2.

The detailed operation of the general embodiment shown in FIGS. 1 and 2 is best described in connection with the detailed block diagrams of FIGS. 3 and 4. REferring to FIG. 3, delay line S preferably comprises a glass rod of approximately 15 cm in length, into which shear pulses are introduced on the left-hand side by means of a piezoelectric transducer. These pulses propagate through the length of the rod and are converted by another piezoelectric transducer back into electrical pulses at the right end of the glass rod. SV is a writing amplifier for the input pulses, and LV is a reading amplifier which amplifies the output pulses. RL is a feedback line to recirculate pulses through glass rod S to form a dynamic binary storage loop. In this particular embodiment, a pulse traversing S has the binary value O. The lack of a pulse signifies 1. When, therefore, no information other than 0 is stored, an uninterrupted succession of pulses traverses rod S, which pulses are entered into and extracted from the storage loop by means of the bit timing pulses $t$.

In detail, this occurs as follows: The bit timing pulses $t$ are generated with a frequency of, e.g., about 4 megacycles by a crystal-controlled pulse generator as a square-wave pulse having equidistant edges. As shown in FIG. 4, clock pulse T is applied among others to clamp $t(1)$. Each trailing edge of the clock pulse sets a bistable flip-flop FL to the binary state indicated in FIG. 4. The time interval unit the arrival of the next leading edge of clock pulse $t$ is utilized as a tolerance interval during which a pulse emanating from the reading amplifier LV may arrive from the delay line S in order to be safely recirculated through the storage loop. If during this interval, such a pulse is received from amplifier LV, it throws the flip-flop FL into its opposite state by way of the reset input 1. There FL applies an enabling potential from its output 3 and the feedback line RL to an AND-gate K1, which will let the next clock pulse *t* pass through over input *t*(2), whereby the writing-in of a pulse is initiated via an OR-gate D1 and the writing amplifier SV into the input of the delay line S. If, however, during the time between two consecutive *t* pulse trailing edges, no pulse has arrived from LV at the reset input 1 of the flip-flop FL, the flip-flop FL remains in the state in which it keeps AND-gate K1 closed via RL during the succeeding *t* pulse so that this pulse is unable to write a pulse into delay line S.

The illustrated embodiment is to be used with four complete 16-position main registers A, B, C, and D, whereby the main registers A, B, and C serve especially for calculations in the four fundamental operations and D serves as accumulation storage register; register A serves, among other things, to accept input numbers and to discharge output numbers into an indicator or printing mechanism. The decimal numbers are handled in binary coded decimal form whereby each numeral is represented by four bits *a*, *b*, *c*, and *d* of one tetrad.

All of the bits of all main registers traverse the delay line S consecutively, and only by time interval selection is it determined to which register (A, B, C, D), to which digital position (1—16), and to which tetrad position (*a*,*b*,*c*,*d*) each of the bits corresponds.

Using the above-mentioned designations, A1*a* designates the bit which is the first tetrad position (*a*) of the digital position 1 of the register A; C14*b* designates the second tetrad bit of the 14th digit position of register C. The significance of the succession of bits appearing with the clock pulse *t*, e.g., at the output of S, is organized in such a manner that the following interspersed serial code results:

...A1*a*, B1*a*, C1*a*, D1*a*; A2*a*, B2*a*, C2*a*, D2*a*; ...A 16 *a*, B 16 *a*, C 16 *a*, D 16 *a*; A1*b*, B1*b*, C1*b*, D1 *b*; ...D 16 *b*; A1*c* ...D 16 *c*; A1*d* ...D 16 *d*; A1*a*...

Figure 5:
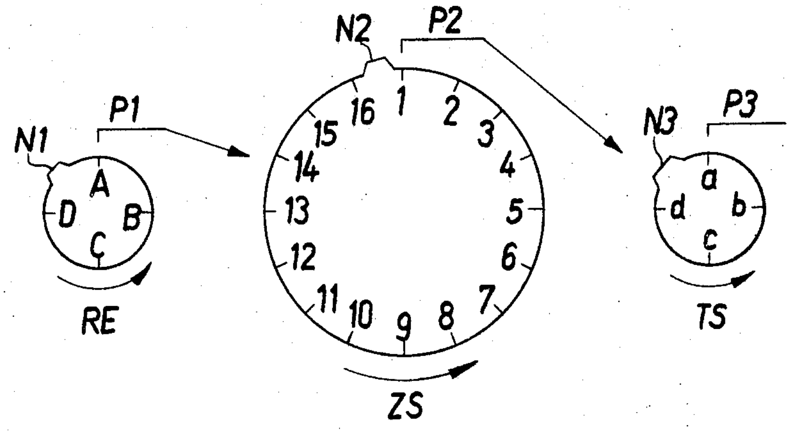
FIG. 5 is a graphical illustration of the time interval selection principle utilized in the interspersed serial code of this invention.

The graphic representation in FIG. 5 serves to give an easier survey of this interspersed sequence. Here it is assumed that a scale RE (register) is turned by one-quarter in the direction of the arrow with each clock pulse *t*. Upon completion of each revolution, that is with every fourth step, a further scale ZS (digital position) is turned by one-sixteenth as shown by the switch projection N1 and the arrow P1. This second scale ZS again causes, upon completion of one revolution, that is with its 16th step, a third scale TS (tetrad position) to turn by one-fourth, as indicated by projection N2 and arrow P2. A stroboscopic screening of the symbols in the top position during one clock pulse *t* would result in the determination of the sequential position, using the designations given above, of a bit generated at this clock pulse *t*.

In the above-noted code, assuming the code has *n* bits and the delay line has a transit time E and a bit capacity *m*, the time dispersion between consecutive digit positions of the same number is equal to E/*n*, and the time dispersion between corresponding digit positions of different numbers is equal to E/*m*.

Therefore, $4 \times 16 \times 4 = 256$ pulses must be stored in the delay line S and must be recirculated with the same number of clock pulses *t*. The tetrad positions *a*, *b*, *c*, *d* of a tetrad to be read out follow each other with a distance of 64 *t*. After the tetrad bit (*a*) has been read, therefore, the scale RE has to advance 3 times with 64 steps each to screen the remaining tetrad bits *b*, *c*, and *d*. If, after another 64 steps of the scale RE, one would read out again, the bit (*a*) of the same tetrad would be read again, and the remaining bits of this tetrad would follow upon continuation of this cycle.

After each reading-out of one tetrad position *d*, the cycle can be interrupted through the control mechanism of the machine as indicated in FIG. 5 by the projection N3 and the arrow P3. This can be explained in that during the transition of the projection N3 over the shaft of the arrow P3, paths are opened through which the timing of the following cycle can be changed once, i.e., only for one cycle. One can see without difficulty that if, after reading of a tetrad position *d*, a cycle of 60 *t* in length is connected (60 steps of scale RE), this would mean a transition into the next lower digital position ZS of the same register. If, on the other hand, after reading of *d*, a cycle of 68 *t* is connected, this means transition into the next higher position of the same register.

With regard to the transition from a 16th register position to a 1st register position, the sequence of bit designations around the transition point from D 16 *d* to A1*a* is: ...A 16 *d*, B 16 *d*, C 16 *d*, D 16 *d*; A1*a*, B1*a*, C1*a*, D1*a*... The transition from tetrad position *d* of the 16th position of a register to tetrad bit (*a*) of the 1st position of the same register occurs, therefore, after 4 clock pulse steps *t*, which, in the frequency of this particular embodiment, corresponds to 1/*us*. The transition, for instance, from A 16 *d* to B1*a* would occur through 5 clock pulse steps *t*, to C1*a* through 6 clock pulse steps *t*, to D1*a* through 7 clock pulse steps *t*. These time periods are too short for processing in the machine. Therefore, a blank phase is connected by the control mechanism for this transition from bit *d* of a 16th position to bit (*a*) of a first position after reading of said bit *d*. This blank phase consists of three intervals of 64 *t* each. Connected thereto is then the selection interval which now selects bit (*a*) of the first position of the desired register. If, for instance, the selection interval is 65 *t*, and one was working in register A, one now arrives in register B. A selection interval of 66 *t* would result in the transition from register A to register C, etc.

At this point it must be noted that all these transitions which must take place during one particular arithmetic function, for instance through depression of one key, in the most diverse sequences, have to be recorded based on one basic reference point, so that one can determine at any time which storage position in which register is associated with the bit just read. This is done by the control mechanism of the calculator which continuously registers the transitions from the basic reference points or has them already firmly wired in according to the arithmetic program. In the present embodiment, it is intended that after completion of each arithmetic process started by the depression of one key, the final step automatically involves transition to register A.

The following devices are provided to actuate the clock pulses for writing or reading of bits in the calculator according to the above-described interspersed serial code. The crystal controlled clock pulse generator in FIG. 3 is designated Q. Its output pulses *t* travel through a gate H1 to a binary counter Z1 which counts to 60. As long as this counter position (60) is not reached, the counter Z1 keeps the gate H1 open via a control line SL1. When the counter Z1 reaches 60, the gate H1 is closed by a control line SL1 and a gate H2 is opened instead by a control line SL2. The clock pulses *t* now travel through H2 to a 4-stage binary counter Z2. This counter Z2 can be preadjusted so that the number of upward counting steps up to its maximum counting position, at which point a clock pulse T is formed through an AND-gate K 11, can be set by the control mechanism LW for the values from 0 to 8. When the number of these steps equals 0, i.e., the counter Z2 is already set to its maximum counting position, and AND-gate K 11 is enabled when the counter reaches 60 and thus directly actuates the clock pulse T. In the other cases, the AND-gate K 11 is enabled by Z1 and the clock pulse T is generated through this AND-gate when the counter Z2 reaches its maximum counting position. This happens, for instance, in 4 upward counting steps of Z2 with a delay of 4*t*, in 8 upward counting steps with a delay of 8*t*. The clock pulses T determine the intervals at which bits are read out of the dynamic storage loop through a gate H4 or are written into the storage unit through a gate H6. Remembering the above-described time scheme, it is clear that in order to be able to consecutively read out or write in the bits *a*, *b*, *c*, and *d* of a tetrad, the counter Z2 has to be set for 4 steps. If after reading the bit *d*, the setting remains on this value, the same tetrad is again read. To transfer into the next higher or next lower register position, respectively, the counter Z2, after reading of *d*, is nonrepeatingly preset to the step number 8 or 0, respectively. If after reading or writing of a *d*-bit, the counter Z2 is nonrepeatingly preset for 5, 6, or 7 counting steps, this will effect the transition, for instance, of register A to B, or to C, or to D, respectively, by one-time use of the counting numbers 3, 2, or 1, one transfers, for instance, from register D back to C or B or A, respectively.

Each starting clock pulse T of the counter Z2 is also applied as an enabling potential to AND-gate K 12, at whose output a feedback line RS for the counter Z1 is attached. The clock pulse *t* is coupled to the second input of K 12, so that the clock pulse *t* following the enabling of K 11, resets the counter Z1 through K 12, whereby K 11 and H2 are closed again, but H1 is opened and the counter Z1 begins to count anew.

Each clock pulse T further enters the upward counting input of a further binary counter Z3, which normally counts up to 4 and then emits a clock pulse TST. This clock pulse (position timing) indicates the time intervals after the 4 bits *a*, *b*, *c*, and *d* of a tetrad are discharged or written in, respectively. The counter Z3 can be switched over by the control mechanism LW in such a manner that once it counts to three only. This serves to indicate the end of the above-described blank phase after which the transition from a 16th to a 1st position is to be made.

Each starting pulse TST of the counter Z3 also enters the upward-counting input of a 4-stage binary counter Z4, which always counts to 16 and then emits a clock pulse TSP. This clock pulse indicates the point at which the 16 positions of a register were counted through, in other words, that the 4 × 16 bit storage positions of a register were read out or written in, respectively.

As long as the 256 bits are to circulate without any interference in the dynamic storage loop containing delay line S, they are, as described earlier, returned directly through a gate H3 to the input of the delay line S by the flip-flop FL. Clock pulses T, however, cause a bit read out at time T to be taken over by a flip-flop F5 through the gate H4, this flip-flop F5 being the first element of a 5-stage shift chain SK. Each bit taken into F5 can then be shifted via stage F4 and the following stages to stage F1 by the timing pulses T. Stage F2 is connected to the feedback line RL through the gate H6. Gate H6 can also be opened by clock pulse T, whereby gate H3 is simultaneously closed with the effect that now the binary state of F2 is given to the input of the storage path S. Tetrad bits taken out of the storage path S through gate H4 can therefore be shifted through stages F5 on to F2 and can be reentered into S from F2.

When the bits *a*, *b*, *c*, and *d* are positioned in stages F5 to F2 of the shift register SK, they can be taken off in parallel by action of a clock pulse TST (after this clock pulse has been related to register A through presetting of the counter Z2) and can be transferred into the corresponding four positions of a 4-stage indicator register AR where they can remain for four pulses intervals T. The bit patterns of this tetrad can be decoded, in a known manner, by a decoding network which is either part of AR or connected to AR and can then, for instance, light up an indicator tube which will indicate the associated decimal number. The tetrads of the individual positions of register A can now be sequentially shifted by clock pulses T, as explained above, to F5 on to F2 and entered into AR by clock pulses TST. This occurs at high speeds and with several runs through all positions of register A, with the effect that the digit indicator lamps connected via a position distributor are actuated only for a very short period each time but in rapid succession, thus producing a fixed picture of the digit indicator lamps which shows the contents of register A. The tetrad sequence frequency in shift register SK is high enough for the control of a type-printing mechanism with, for instance, arrestable printing rods or wheels of a known type to compare the code emanating from a printing type position indicator and corresponding at each instance to the type character arriving in printing position with the digital code of all register positions to mark, for instance, those positions in a shift register, which coincide and to arrest the rod or wheel, respectively, or this type position at these points so that upon one run of the type position indicator all positions of the printing mechanism are set and the printing can take place in one stroke.

The flip-flop F5 of the shift register SK is connected to one input and the flip-flop F1 to the other input of a serial adder SA, and the output of SA is connected to the transfer input $T_r$ of flip-flop F4 to transfer a logic summation result to flip-flop F4. Subtractions are made by commuting the tetrads of the subtrahend upon entry into the shift register SK to their complements. Since the tetrad positions are read into the shift register SK from the left in the sequence *a*, *b*, *c*, *d*, the bit (*a*) of the previously read-in tetrad moves to F1 at the same time as the bit (*a*) of the next tetrad is being read into F5. SA bits (*a*) of both these numbers can therefore be added to each other in adder SA and the result can then, with the next clock pulse, be stored in flip-flop F4. The control mechanism takes care, in the manner already known, that the register positions are consecutively introduced into SK whereby the tetrad from the register of the one summand is always followed by the tetrad from the corresponding register of the second summand. At the same time it is provided that the bits *a*, *b*, *c*, and *d* of the summand introduced in second place can only move to the flip-flop F5 and can not go from there to F4. For this purpose, the transfer unit $T_r$ between F5 and F4 is opened during the input of the second summand. With the next shift pulse T, therefore, not the contents of F5, but the contents of adder SA (that is, the sum of the two *a*-bits with consideration of possible decimal carries) are moved to F4 whereby the timing coincides again with the entrance of a tetrad position (*a*) into F4. The value then moves on in shift pulse timing, followed by the other sum bits coming from adder SA and formed under consideration of binary carries, until the sum bit (*a*) appears in F1, while simultaneously the sum bit *d* is moved from adder SA to F4 (and, if required, a decimal carry for the following position is noted in SA). It might be necessary to effect a correction of the sum tetrad, in a known manner, e.g., with a 3-excess code or when a pseudotetrad developed in a pure binary code, which fact was noted in SA during the adding process. The gate H4 is blocked, therefore, when the sum bit (*a*) moves to F1, and instead of F5, the correction bit channel KORR is placed at the second input of the adder so that with the next pulse (again at the same time when otherwise an *a*-bit would come from F5) the corrected sum bit (*a*) is moved from the output of SA to F4. The corrected *a*-bit then moves to F3, while the corrected *b*-bit enters F4, and with the next pulse interval the *a*-bit moves to F2, from where it is now inscribed at the correct *a*-interval into RL via H6, and the subsequent sum bits *b*, *c*, and *d* move correspondingly.

While the corrected sum bit *d* is transferred from SA to F4, the *a*-bit of the next position of the first summand can simultaneously be transferred from FL to F5 through the gate H4 now reopened by the control mechanism. At the same time the transfer unit $T_r$ between F5 and F4 is reconnected by the control mechanism. Following the sum bit *d* (which is read out over F2), the tetrad of the new summand position of the first summand now moves toward the right, and a new addition cycle of the type described begins at the moment when the *a*-bit of the first summand arrives in F1 and the *a*-bit of the second summand arrives in F5.

In order to put values into the dynamic storage loop, a 10-key keyboard is provided which is symbolized in FIG. 1 by the box ZT. Each time a key is punched down, a contact is closed which selects the tetrad code of the number to be stored in a code matrix, the bits of this code are then fed, in parallel, into the stages F5 to F2 of the shift chain SK. It has been mentioned already that the timing pattern of the pulses T at the end of each calculating operation is related to the register A by the control mechanism LW. The transferred tetrad bit (*a*) is fed from F2 into the input of S during the tetrad position (*a*) time interval, then the bit *b* moves to F2 by means of a shift pulse T to be fed in during the tetrad position *b* time interval and so on. It depends on the time of opening of coincidence gates K2, which are interconnected into the bit transmission paths between ZT and F5 to F2, into which register position of the still empty register A the punched tetrads are moved. It is hereby provided that the register position is selected by means of a decimal point register KE, in front of which the decimal point of the given numbers is to be placed. This decimal point remains a fixed point in the same position during the input and calculation of several values, and the result values are also positioned within the result register in relation to this fixed decimal point.

After selection, by means of a pusher or knob, of the register position in KE in front of which the decimal point is to be placed, the binary number corresponding to this decimal number of this register position is selected in a mark counter MZ. A comparator VG is provided which is applied, on the one hand, to the values of the binary positions of the mark counter MZ, and, on the other hand, to the values of the binary positions of the counter Z4. As mentioned earlier, the counter Z4 counts through the register positions 1 to 16 in a cycle, i.e., it contains a sequence of these numbers in binary form. When the counter contents of MZ and Z4 coincide, the comparator VG generates an opening signal to the gates K2. The exact time of passage through the gate is determined by the succeeding pulse T which also is applied to the gates K2. When a digit key is punched, a flip-flop is set within the control mechanism LW, after a predetermined delay time, whereupon the following steps develop: The positions 1 to 16 are counted through once, controlled by Z4, whereby the tetrads move through H4 and F5 to F2 and are written in again through H6. The timing pattern of the pulses T thereby initiates, in the manner described above, an upward displacement by one position, i.e., the pulses read out are rewritten into the next higher register position. Generally, these are at first zero-tetrads; at the time mentioned above, however, (one position to the right of the decimal point) the punched tetrad is shot from ZT through the gates K2 into F5 to F2, and stored in the position left of the decimal point through F2 and RL. The same thing happens to the second punched value, while, at the same time, the first punched value is moved into the second position in front of the decimal point, etc.

As soon as the decimal point key KT is punched, it sends a signal into the control mechanism LW to initiate the storage process in another manner. Upon punching a digit key, a pulse is now applied through gate H5 to the mark counter MZ with the effect that it counts down by 1. This results in the comparator VG generating the gate-opening pulse for the coincidence gates K2 to store the digits at the moment when the punched digit has to move to the position in register A which is to the left of the marked position. The upward displacement is always interrupted after the position following the marked position. The digits punched in after the decimal point are therefore lined up in register A, beginning with the decimal point, consecutively from the higher to the lower register positions. The whole figure is now, as a whole, entered in A with the correct decimal point, i.e., corresponding to the decimal point preset in KE.

Figure 4:
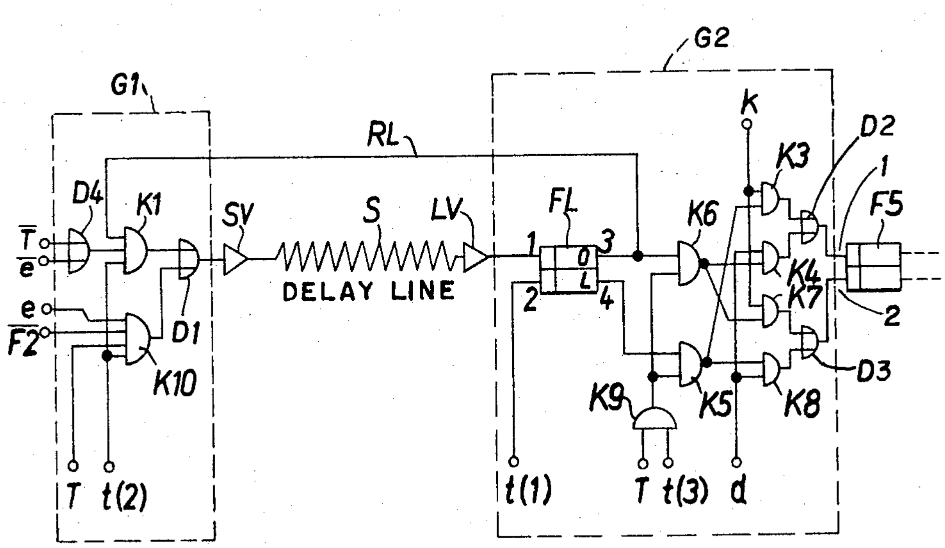
FIG. 4 is a detailed block diagram of the input and output gating circuits for the delay line S shown in FIGS. 1 and 3.

Referring to FIG. 4, the gate controls for reading and writing in delay line S are shown in detail. The direct rewriting through circuit RL of the dynamic storage loop has been described above in conjunction with FIG. 3. All discharges and transfers from the storage loop-the latter, if need be, in conjunction with additions or subtractions, respectively—as well as input into the storage loop occur, as could be seen already in the above description, through the shift chain SK of which only the flip-flop F5 is shown in FIG. 4. The gate H4 of FIG. 3 consists, according to FIG. 4, of a gate combination disposed between FL and F5. The outputs 3, 4 of FL thus control the inputs 1, 2 of F5, so that F5, timed by pulses T, is controlled by FL. Input 1 of F5 takes over, through the OR-gate D2, either from AND-gate K3 or from AND-gate K4. K3 takes over from the output 4 of FL, through AND-gate K5; K4, however, takes over from the output of FL, through AND-gate K6. Input 2 of F5 takes over, through OR-gate D3, either from AND-gate K7 or from AND-gate K8, whereby AND-gate K7 takes over from K6 and AND-gate K8 takes over from K5. By applying a gate-enabling circuit *d* to the gates K4 and K8, the logical values can be transferred directly from the outputs 3 and 4 of flip-flop FL to F5, namely from output 3 to input 1, as well as from output 4 to input 2. However, when the gate-enabling voltage *k* is applied to gates K3 and K7, the above values are transferred to F5 in the opposite way. Therefore, the voltage *d* is to be applied for positive value outputs, and the voltage *k* for complementary outputs for the purpose of subtraction. The time of a transfer from FL to F5 is determined through the coincidence gate K9, whose output can give a gate-enabling voltage to the gates K5 and K6. This happens when a clock pulse T (which, as explained earlier, is a pulse of the selection time pattern) is applied in an input of K9 and when furthermore a bit pulse *t* appears at the second input *t*(3), which pulses effects the precise phasing of the timing.

The bit values to be written in are applied to the writing amplifier SV through the OR-gate D1 either by the AND-gate K1 mentioned above or by a second AND-gate K10. The AND-gate K1, which corresponds to the gate H3 of FIG. 3, is kept open for circulation through path RL by an OR-gate D4, as long as voltages $\overline{T}$ (no T-pulse present) and $\bar{e}$ (no write-in order from the control mechanism present) apply. AND-gate K10, however, transmits the write pulses when the writing occurs through flip-flop F2 of the shift chain SK and the path RL. To write a pulse into S through SV and D1, the following signals have to be applied to K10: the write-in order *e* at one input; $\overline{F2}$ at another input, i.e. flip-flop F2 is at 0; a T pulse at a third input; and at the fourth input *t*(2) a bit pulse *t* which gives the precise timing reference.

As already mentioned several times before, the generation of the selection pulses T is under control of the control mechanism LW which also provides the other required control voltages corresponding to the programs to be processed, as this is generally known in the art of electronic calculators. In a table-model calculator, as is also common knowledge, the individual calculations in the four fundamental operations and required ancillary processes, as, for instance, exchanges, erasures and the like, are initiated by operating keys. These keys cause the control mechanism to run off a fixedly wired program corresponding to the respective process, which program contains the above-described individual processes in suitable combination. Since the above-noted control functions are well known in the art, the specific circuits for carrying them out have not been shown in the drawings, and it will be understood that any suitable prior art circuits can be used for this purpose.

It will be understood that the above description of the present invention is susceptible to various modifications, changes, and adaptations, and the same are intended to be comprehended within the meaning and range of equivalents of the appended claims.

I claim:

1. A calculator circuit for performing arithmetic operations on signals representing binary coded input numbers and for producing output signals representing the result of said arithmetic operations, comprising, in combination:

a. a dynamic pulse storage loop including a pulse delay line, input means for applying a train of pulses representing binary coded numbers to one end of said delay line, output means for receiving said train of pulses at the other end of said delay line, and feedback means coupled between the input and output means of said delay line for continuously recirculating said train of pulses through said delay line;

b. timing circuit means coupled to the input means and output means of said pulse storage loop for defining an interspersed serial code in which the individual bits of at least two binary coded numbers are interspersed with each other in said train of pulses, each bit of each binary number being adjacent in the pulse train sequence to the corresponding bit of a different binary number, whereby the consecutive bits of each binary number are separated from each other in the pulse train sequence and are interspersed among the individual bits of other binary numbers;

c. shift register means coupled to the input means and output means of said pulse storage loop and to said timing means for introducing binary coded numbers into said pulse storage loop in accordance with said interspersed serial code and for extracting individual binary coded numbers from the interspersed serial pulses circulating in said pulse storage loop;

d. said timing circuit incorporating means for operating said shift register at a shift frequency which is substantially lower than the bit rate of said pulse storage loop and which is synchronized with said bit rate in accordance with said interspersed serial code;

e. means coupled to said shift register for receiving binary coded numbers from said shift register and performing arithmetic operations on such binary coded numbers and for shifting signals representing the result of said arithmetic operations into said shift register;

f. means coupled to said shift register for applying input signals thereto representing binary coded input numbers upon which arithmetic operations are to be performed; and g. means coupled to said shift register for receiving output signals therefrom representing the result of said arithmetic operations.

2. A computer circuit as defined in claim 1, wherein said means for performing arithmetic operations comprises a serial adder circuit.

3. A calculator circuit as defined in claim 1, wherein said delay line has a transit time E and a bit capacity $m$, said binary coded numbers being represented by an $n$-digit binary code, the time dispersion between consecutive digit positions of the same number being equal to $E/n$ when coded, the time dispersion between corresponding digit positions of different numbers being equal to $E/m$ when coded, and wherein said timing means includes means for generating selection pulses for each cycle $n$ in the bit timing sequence and means for varying the time interval between the $n$th selection pulse and the following selection pulse.

4. A calculator circuit as defined in claim 2, wherein said shift register includes $n+1$ stages, the first and last stages thereof being coupled to the inputs of said adder circuit, the next to last stage thereof being coupled via said feedback means to the input of said pulse storage loop, the second stage thereof being connected to the output of said adder circuit, the first stage thereof being coupled to the output of said pulse storage loop, and also including means for separating the transfer connection between said first and second stages thereof.

5. A calculator circuit as defined in claim 4, wherein, upon separation of the transfer connection between said first and second stages of said shift register while the contents thereof are being shifted into said adder, one input of said adder is first coupled to the output of said first stage and next to a correction bit channel comprising a part of said adder circuit.

6. A calculator circuit as defined in claim 4, wherein said input means comprises an $n$ stage register and said output means comprises a $n$ stage register, the individual stages of said shift register being coupled in parallel to the corresponding stages of said input and output registers.

7. A calculator circuit as defined in claim 6, and further comprising gate means coupled between the individual stages of said input means and said shift register, and means for actuating said gate means at predetermined times to transfer binary coded numbers from said input means to said shift register.

8. A calculator circuit as defined in claim 7, wherein said last mentioned means comprises a first counter preset to correspond to a preselected decimal point position, a second counter in said timing circuit and responsive to the timing signals thereof, and comparator means coupled between said first and second counters and to said gate means for producing transfer pulses to transfer said numbers at times corresponding to the preselected decimal point position in the timing sequence defined by said timing circuit.

9. A calculator circuit as defined in claim 8, including a decimal point key which, when activated, initiates a downward counting of said first counter.

10. A calculator circuit as defined in claim 1, wherein said timing circuit includes a clock pulse circuit for producing equally spaced bit time pulses, a first variable counter coupled to said clock pulse circuit, and means for preselecting the maximum count of said first variable counter so that the output pulse thereof occurs at a predetermined position in the interspersed serial code defined by a said timing circuit.

11. A calculator circuit as defined in claim 10, wherein said first variable counter comprises a fixed counter coupled in additive relation with a variable counter, the maximum count of said variable counter being adjustable from zero to $2r$, where $r$ is the number individual binary coded numbers contained in said interspersed serial code, while said fixed counter always counts from zero to $r\ (s-1)$, where $s$ is the number of binary bits in the individual binary coded numbers.

12. A calculator circuit as defined in claim 11, and further comprising a second variable counter coupled to the output of said first variable counter for periodically counting the corresponding bits of said binary coded numbers.

13. A calculator circuit as defined in claim 12, and further comprising a second fixed counter coupled to the output of said second variable counter for counting complete cycles of said interspersed serial code.